(12) United States Patent
Walker et al.

(10) Patent No.: US 7,036,772 B2
(45) Date of Patent: May 2, 2006

(54) SPACECRAFT WITH EXTENSIBLE RADIATORS

(75) Inventors: Andrew Nicholas Walker, Toulouse (FR); Jean-Pierre Guerin, Velizy-Villacoublay (FR)

(73) Assignee: EADS Astrium SAS, Velizy-Villacoublay (FR)

( * ) Notice: Subject to any disclaimer, the term of this patent is extended or adjusted under 35 U.S.C. 154(b) by 0 days.

(21) Appl. No.: 10/871,934

(22) Filed: Jun. 18, 2004

(65) Prior Publication Data
US 2005/0023415 A1 Feb. 3, 2005

Related U.S. Application Data

(63) Continuation of application No. PCT/FR02/04428, filed on Dec. 18, 2002.

(30) Foreign Application Priority Data
Jan. 2, 2002 (FR) .................................. 02 00006

(51) Int. Cl.
*B64G 1/58* (2006.01)

(52) U.S. Cl. ................................................. 244/171.8
(58) Field of Classification Search ............. 244/171.8, 244/172.6, 171.7; 165/41
See application file for complete search history.

(56) References Cited

U.S. PATENT DOCUMENTS

| 5,927,654 | A | 7/1999 | Bronson et al. | |
|---|---|---|---|---|
| 6,311,931 | B1 * | 11/2001 | Smay | 244/164 |
| 6,378,809 | B1 * | 4/2002 | Pon | 244/173 |
| 6,854,510 | B1 * | 2/2005 | Low et al. | 165/41 |

FOREIGN PATENT DOCUMENTS

| EP | 0 780 293 A | 6/1997 |
|---|---|---|
| WO | WO 99 19212 A | 4/1999 |

OTHER PUBLICATIONS http://www.boeing.com/defense-space/space/bss/factsheets/702/702fleet.html.*
http://www.boeing.com/defense-space/space/bss/factsheets/702/galaxy_xi/galaxy_xi.html.*
http://www.space-technology.com/project_printable.asp?ProjectID=2035.*
Copy of Santo A G et al : "Near Earth asteroid rendezvous spacecraft overview" Aerospace Applications Conference, 1996. Proceedings., 1996 IEEE Aspen CO, USA Feb. 3-10, 1996, New York, NY, USA IEEE, US, Feb. 3, 1996, pp. 131-144, XP 010159043 ISBN: 0-7803-3196-6 *p. 138, alinéa 2*.

* cited by examiner

*Primary Examiner*—Peter M. Poon
*Assistant Examiner*—Timothy D. Collins
(74) *Attorney, Agent, or Firm*—Sturm & Fix LLP

(57) ABSTRACT

The invention concerns a space craft, such as a telecommunication geostationary satellite, comprising a body, at least one main telecommunication antenna having a specific orientation relative to the body, at least a omnidirectional antenna having a field of view opposite to that of the main antennae and at least a radiator extensible by tilting about an axis linked to the craft body between a stowing position wherein it is pressed against the body and an extended position. The axis is positioned substantially in the plane of one surface of the body parallel to the orientation of the omnidirectional antenna and to the surfaces or the surface bearing the main antenna. The radiator tilts at an angle close to 180° from a position wherein it is pressed against one surface bearing a solar panel to a position wherein it extends substantially in the plane of the surface which bears it when it is stowed.

8 Claims, 3 Drawing Sheets

SPACECRAFT WITH EXTENSIBLE RADIATORS

CROSS REFERENCE TO RELATED APPLICATIONS

This application is a continuation of PCT/FR02/04428 filed Dec. 18, 2002, claiming priority of French Application No. 0200006 filed Jan. 2, 2002, which is included in its entirety by reference made hereto.

BACKGROUND OF THE INVENTION

1. Field of the Invention

The invention relates to spacecraft fitted with heat radiators designed to dissipate the thermal energy generated on board the craft into space.

It relates more especially to spacecraft designed as satellites placed into a geosynchronous orbit, and notably into a geostationary orbit, stabilized so that a given axis of the satellite stays directed toward the Earth.

This latter case is that of telecommunications satellites which have main antennas designed to stay precisely oriented toward a region of the Earth when the satellite is in position.

The electrical power required for the payload of spacecraft, and of geostationary satellites in particular, is supplied by one or more solar panels which can be oriented about an axis in order to keep them pointed toward the Sun. For geostationary satellites, this axis of rotation of the solar panels, denoted Y-axis, is oriented in a north-south direction.

2. Description of the Related Art

Conventionally, geostationary satellites of this type generally have a design of the type shown in FIG. 1.

The body 10 of the satellite contains the propellant tanks, the payload, the equipment bay and the on-board electronics.

Three axes Z, Y and X associated with the satellite are designed to be oriented toward the Earth, in the north-south direction and in the east-west direction, respectively, when the satellite is in position. Generally speaking, the body of the satellite has the shape of a parallelepiped with north and south faces, a face oriented toward the Earth and a face away from the Earth, often called rear face.

The solar panels 12 are mounted on the north and south faces and are orientable about the Y axis.

The main telecommunications antennas 14 are mounted laterally on either side of the satellite, far enough away from the east and west faces (or from only one of them) to clear their transmission or reception lobe. These main antennas must stay precisely pointing toward the regions of the Earth to be covered owing to their narrow lobe.

For maintaining the satellite in position, the body 10 carries low-thrust nozzles 16, supplied with propellants, a certain number of which are situated at the opposite end of the satellite from the Earth. On recent satellites, these nozzles are complemented by one or more plasma thruster systems 18. In operation, the nozzles or generators generate jets or plumes 20 and 22 of hot gas at high velocity. The impact of these jets on surfaces causes undesirable forces, reduces the efficiency of the nozzles or ion generator and could cause damage to the surfaces.

Conventionally, fixed radiating surfaces 24 are mounted on the north and south faces of the satellite and are thermally connected to the satellite loads that generate heat, for example by heat pipes. The increase in thermal power generated on the more recent high-power satellites makes the thermal dissipation surface area of the fixed radiating surfaces inadequate. Consequently, satellites comprising in addition deployable radiators have been designed, which are held against the body of the satellite during launch and which are later deployed, generally by flipping them, to bring them into an orientation toward the north (and/or south). The configurations to be implemented have been designed notably such that, in the deployed state, the radiators do not obstruct the lobe of the main telecommunications antennas. In particular, a satellite has been proposed (WO 99/19212) whose deployable radiators can be flipped around a hinge starting from a position where they are stored against the north or south face into a position where they are situated at the end away from the Earth (in the −Z direction).

This disposition avoids them interfering with the operation of the main telecommunications antennas. In addition, by placing the hinges obliquely, the radiators 25 can be brought into a divergent configuration which significantly removes them from the impact of high-velocity hot gases which could damage them.

This disposition presents a serious limitation because it does not take other issues into consideration. For recovering the control of a satellite that has lost its nominal orientation, for example owing to a navigation error or a fault, it is not possible to use communications via the main telecommunications antennas 14, since they have a very narrow lobe. Consequently, it is usual to place an omnidirectional antenna 26 (in other words, which has a field of view of at least $2\pi$ steradians) oriented in the −Z direction (nominally, away from the Earth) and often also to place an antenna 26 in the +Z direction. In the latter case, each of the omnidirectional anntenas covers half of space and together they allow communication between the Earth and the satellite to be maintained, whatever the orientation of the latter.

However, in order to achieve this result, the field of view of the omnidirectional antennas must not be obscured, otherwise there may be blind regions in the coverage of the antenna which could result in loss of contact with the satellite.

BRIEF SUMMARY OF THE INVENTION

The object of the present invention is notably to provide a spacecraft with a configuration of deployable radiators which simultaneously avoids masking the field of view of the main telecommunications antenna or antennas, interfering with the plume of the propulsion generator nozzles or obstructing the field of view of an omnidirectional antenna mounted on the rear face of the spacecraft.

For this purpose, the invention proposes, in particular, a spacecraft having a body, at least one main telecommunications antenna having a given orientation with respect to the body, at least one omnidirectional antenna having a field of view opposite to that of the main antennas and at least one radiator deployable by flipping about an axis linked to the body of the craft between a storage position, where it is held against the body, and a deployed position, characterized in that the said flip axis is positioned substantially in the plane of one of the body faces that is parallel to the orientation of the axis of the field of view of the omnidirectional antenna and to the faces (or to the face) carrying the main antenna, the said flip axis being configured such that the radiator can be flipped through an angle close to 180° from a storage position, where it is flat against a face carrying a solar panel, to a position where it extends substantially in the plane of the face which holds it when stored.

In the particular case where the spacecraft is a satellite having a body, at least one main telecommunications antenna mounted on an east or west face, at least one omnidirectional antenna mounted on a face away from the Earth and at least one radiator deployable by flipping about an axis linked to the body of the satellite between a storage position, where it is held against the north or south face of the body, and a deployed position, characterized in that the said axis is positioned substantially in the plane of the north or south face against which the radiator is held when stored and is positioned such that the radiator can be flipped through an angle equal to or close to 180° from the storage position to a position where it extends toward the east and the west from the body, behind a main antenna.

In practice, the tilt angle of the radiator will be in the range 140 to 180°, but it is advantageous that the radiator or each radiator extend substantially in the plane of the face that carries it in storage, in other words that it be orthogonal to the Y direction when deployed.

In general, each of the north and south faces will carry at least one or more, usually two, radiators.

If the flip axes of the radiators are parallel to the Z direction, the maximum length of the radiators which still allows them to be stored (except in the case of a radiator made up of two parts folding one onto the other) is limited to the width of the satellite in the X direction (east-west direction), which width is generally smaller than its length in the Z direction. By orienting the flip axes at substantially 45° to the Z direction, it is possible for the radiators to have a span almost equal to the length of the satellite in the Z direction, as long as the deployment of the radiators is not activated in certain orientations of the solar panels.

BRIEF DESCRIPTION OF THE DRAWINGS

The above features, as well as others, will become clearer upon reading the following description of specific embodiments of the invention, presented as non-limiting examples.

The description makes reference to the accompanying drawings, in which.

DETAILED DESCRIPTION OF THE INVENTION

Figure 1:
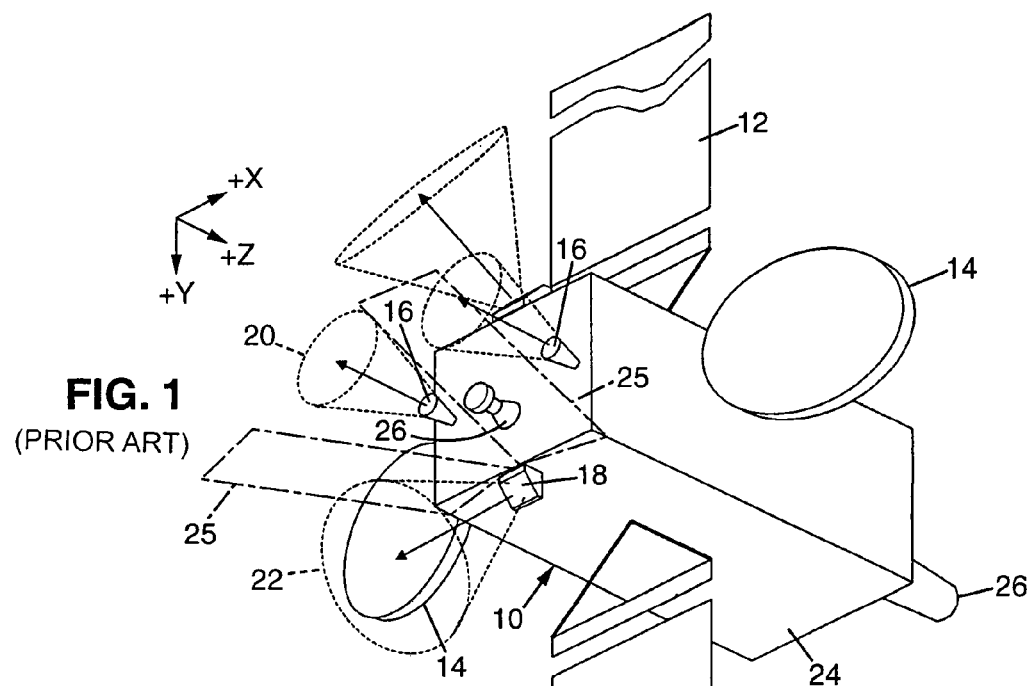
FIG. 1, already mentioned above, shows the functional design of a representative satellite.
Figure 2:
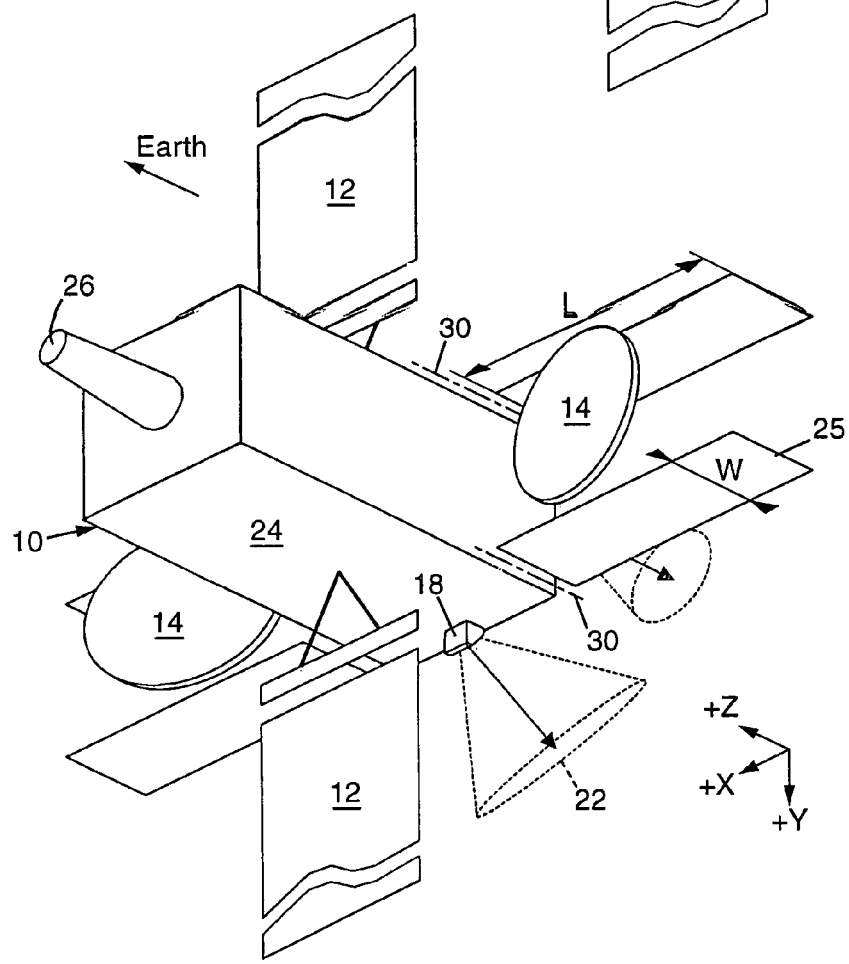
FIGS. 2 and 3, similar to FIG. 1, are perspective views showing a possible configuration of radiators according to the invention.
Figure 3:
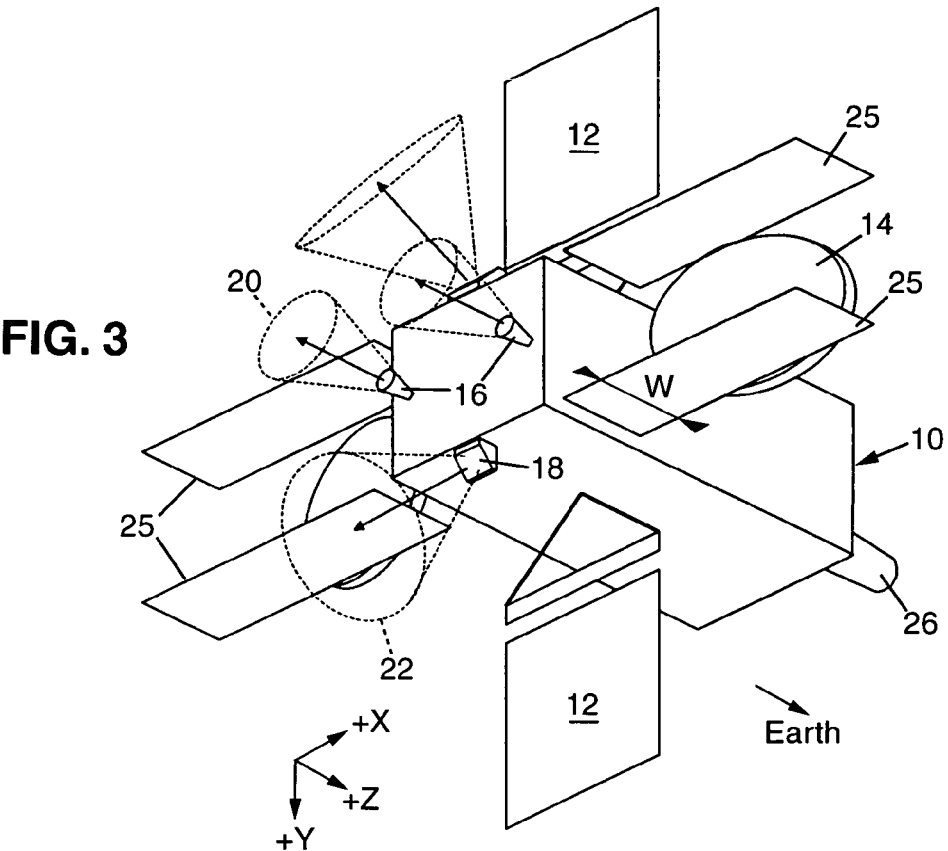

The satellite whose functional architecture is shown in FIG. 2, where the elements corresponding to those in FIG. 1 carry the same reference number, has four radiators 25, in addition to the fixed radiating surfaces 24 of conventional design. Two of these four radiators are designed to tilt symmetrically about a Z-direction axis 30, from a storage position where they are flat against the north face to a deployed position where they are virtually within the extension of this north face, behind the main antenna reflectors 14 so as not to interfere with the lobe of these antennas. The width W of these radiators is thus limited to that of the free space behind the antenna reflectors 14. Their length L is limited to the width of the body in the X direction. The deployment mechanism can be of conventional design and, for example, may consist of one or more springs that, when a retaining catch is released, for example, by pyrotechnic means in response to a command from the ground, bring the radiator into a deployed position determined by an end stop.

A second pair of radiators 25 is configured so as to be brought into a position substantially in the extension of the south face when they are deployed.

Figure 4:
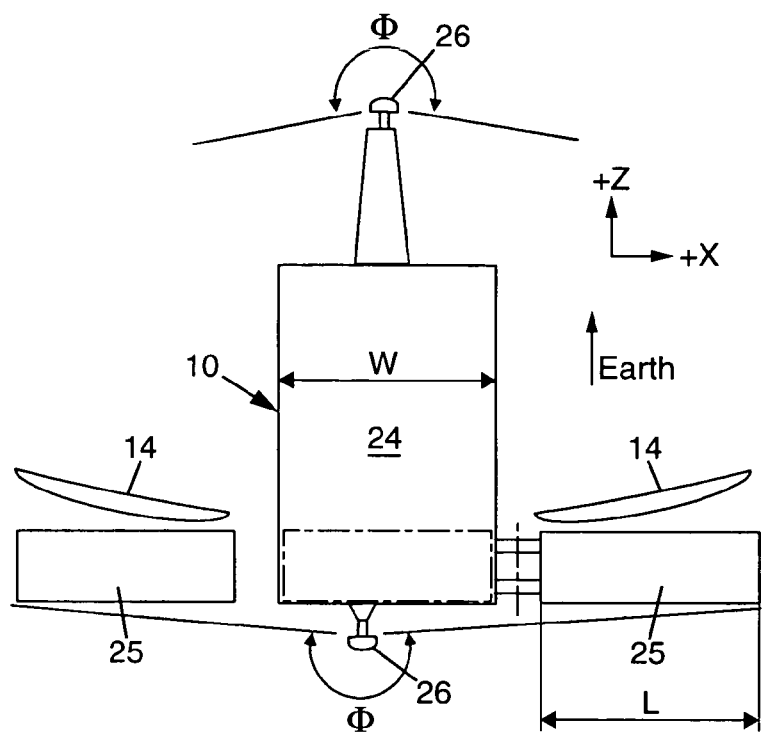
FIG. 4 is a plan view showing a north or south face of a satellite with a different configuration of radiators according to the invention.

It can be seen that the deployed radiators do not interfere with the lobe of the main antennas. Nor are they positioned in the plume of the nozzles 16 or the thrust generators 16 designed to operate when the satellite is already in its definitive orbit, even when the radiators have been deployed. Finally, as shown in FIG. 4, nor do they penetrate into the lobe Φ of the omnidirectional antennas 26, even for a solid angle that may slightly exceed 2π steradians.

Figure 6:
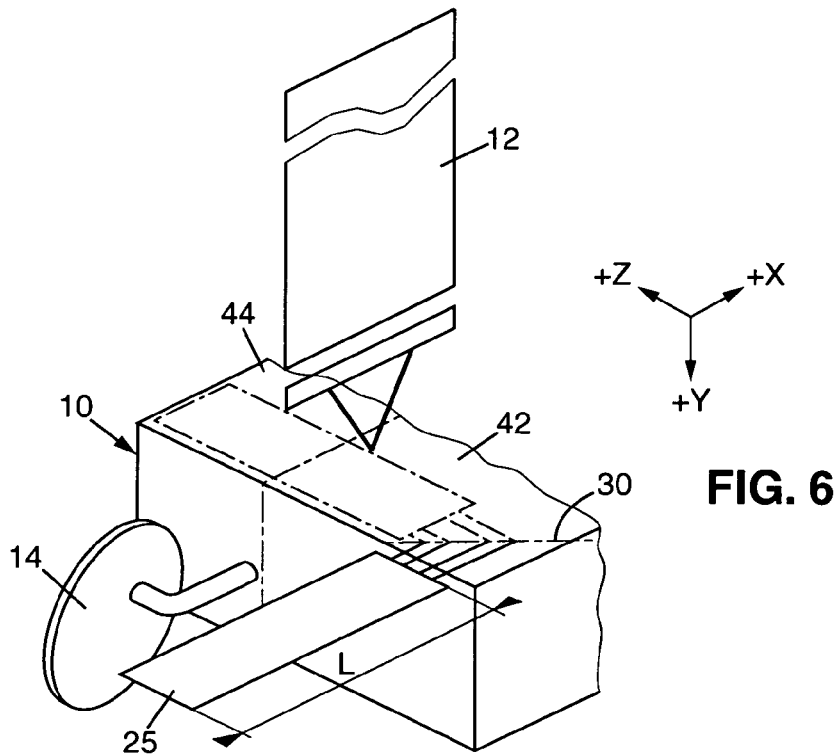
FIG. 6 is a partial perspective view of a radiator arrangement according to FIG. 5.
Figure 5:
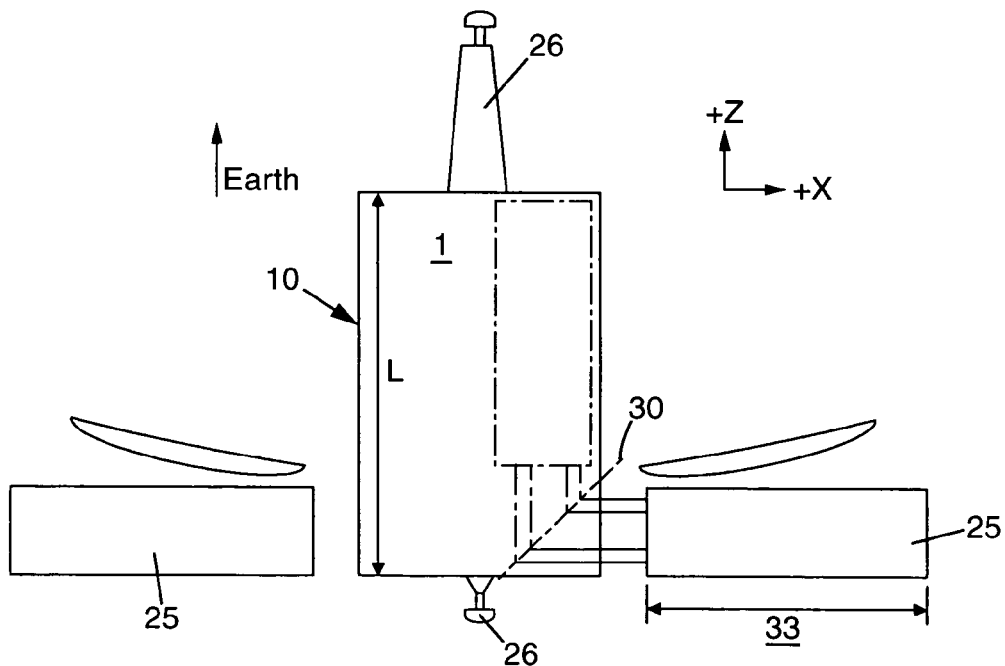
FIG. 5 is a view in the north-south direction showing the positioning of the deployed radiators in the case of an oblique flip axis.

In order that the radiators can be stored without projecting outside of the satellite body (in the position shown by the dashed line), their length L must not exceed the width of the body 10 in the X direction. This limitation can be relaxed by aligning the flip axis 30 substantially along the bisector of the angle X,Z or −X,Z, whichever is appropriate. In this case, the length L is only limited by the length of the body in the Z direction. On the other hand, the width of each radiator is limited by the presence of the axis supporting the solar panel. It should further be pointed out that the body of a telecommunications satellite is often split into a service module or "bus" 42, positioned away from the Earth, and a payload module 44 positioned on the Earth side. With suitable dimensions of the hinge support feet, the arrangement according to FIGS. 5 and 6 allows all possible obstructions of the service module during the period spent in transfer orbit to be eliminated.

The invention claimed is:

1. A spacecraft having a body, at least one main telecommunications antenna carried by at least one of two opposed and substantially parallel first faces of said body and having a given orientation with respect to said body, at least one omnidirectional antenna having a field of view opposite to a field of view of said at least one main antenna and at least one radiator deployable by flipping about a respective flip axis linked to said body of the spacecraft between a storage position, in which said at least one radiator is held against said body, and a deployed position, said flip axis being positioned substantially in the plane of a second face of said body, said second face carrying a solar panel, said flip axis being oriented such that said at least one radiator can be flipped through an angle close to 180° from said storage position, in which said at least one radiator is flat against said second face carrying said solar panel, to said deployed position in which said at least one radiator extends substantially in said plane of said second face against which said at least one radiator is held when stored and in which said at least one radiator projects outside of said body wherein said deployed radiator projects from one of said first faces of said body and on a side of said at least one main antenna which is opposite to said field of view of said at least one main antenna.

2. The spacecraft as claimed in claim 1, consisting of a satellite having at least one main telecommunications antenna mounted on at least one of an east face and a west face of said body so that said field of view of said at least one main antenna is directed substantially toward the Earth when the satellite is in position in an orbit, at least one omnidirectional antenna mounted on a face of said body which is away from the Earth and at least one radiator deployable by flipping about said respective flip axis linked to said body of the satellite between said storage position, in which said at least one radiator is held against one of a north face and a south face of said body, and said deployed position said flip axis being positioned substantially in the plane of said north or south face against which said at least one radiator is held when stored and is oriented such that said at least one radiator can be flipped through an angle equal to or close to 180° from said storage position to said deployed position in which said at least one radiator extends toward the east or the west from said body, and on a side of said at least one main antenna which is opposite to said field of view of said at least one main antenna, wherein said at least one deployed radiator projects from one of said east and west faces.

3. The spacecraft as claimed in either of claims 1 or 2, wherein said flip angle of said at least one radiator is in the range 140 to 180°.

4. The spacecraft as claimed in claim 2, wherein each of said north and south faces of said body carries at least one radiator.

5. The spacecraft as claimed in either of claims 2 or 4, wherein said flip axis is oriented at substantially 45° to the direction of the Earth and said at least one radiator has a span which is almost equal to a length of the satellite in the direction of the Earth.

6. The spacecraft as claimed in claim 4, wherein each of said north and south faces carries two radiators extending one toward the east and the other toward the west from said body.

7. The spacecraft as claimed in claim 1, wherein said flip axis is oriented parallel to said at least one of said first faces of said body which carries said at least one main antenna in said plane of said second face of said body in which said flip axis is positioned.

8. The spacecraft as claimed in claim 1, wherein said flip axis is oriented at 45° to the direction of said at least one of said first faces of said body which carries said at least one main antenna in said plane of said second face of said body in which said flip axis is positioned.

* * * * *